K. RIEDEL.
Lamp.
No. 58,481.
Patented Oct. 2, 1866.
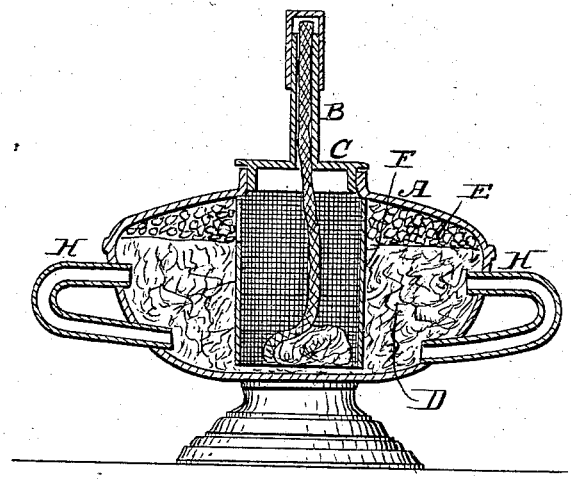
Witnesses:
Jas A Service
J W Honington
Inventor:
Carl Riedel
per Munn & Co
Attys.

UNITED STATES PATENT OFFICE.

KARL RIEDEL, OF GUTTENBERG, NEW JERSEY.

IMPROVEMENT IN LAMPS.

Specification forming part of Letters Patent No. 58,481, dated October 2, 1866.

*To all whom it may concern:*

Be it known that I, KARL RIEDEL, of Guttenberg, in the county of Hudson and State of New Jersey, have invented a new and Improved Safety-Lamp; and I do hereby declare that the following is a full, clear, and exact description thereof, which will enable others skilled in the art to make and use the same, reference being had to the accompanying drawing, forming part of this specification, in which the drawing represents a vertical central section of this invention.

This invention consists in a lamp the oil-reservoir of which is hermetically sealed and filled with some absorbent material, such as raw cotton, sponge, or other substance, with a layer of pounded coal, or other bad conductor of heat, between the top of the oil-reservoir and the absorbent material, in combination with a cylinder of wire-gauze which surrounds the wick in the interior of the lamp, and with two hollow curved handles, in such a manner that with the proper treatment light hydrocarbon liquids—such as naphtha or benzine from petroleum—can be burned with perfect safety.

A represents the reservoir of my lamp, from the top of which rises the wick-tube B. This wick-tube is secured in the cover C, which screws into the reservoir A, and through which access is had to the interior of the reservoir. Said reservoir is filled with raw cotton, sponge, or other suitable absorbent material, D, which is surmounted by a layer, E, of pieces of stonecoal, small pebbles, or other bad conductor of heat, which is non-absorbent and will not expose the oil to the heated upper surface of the reservoir, and the center of the reservoir is occupied by a cylinder, F, of wire-gauze, which protects the wick and allows the same to come in direct contact with the absorbent material at or near the bottom of the reservoir, as clearly shown in the drawing.

The handles H are hollow and curved, as shown, and they open into the reservoir at different points.

The operation is as follows: The absorbent material in the lamp is saturated with the burning liquid, so that on turning up the reservoir no liquid will run out, or, in other words, that no liquid will remain in the same except that absorbed by the cotton or other material. The cover is then firmly screwed down, and the lamp is lighted.

By the layer of coal or other non-conductor of heat, the absorbent material is prevented from getting heated, and the vapors which accumulate in the upper part of the reservoir return through the hollow handles to the lower part thereof, and condense again on coming in contact with the absorbent material.

A very small quantity of burning-fluid will feed the wick in my lamp for a long time, on account of the extensive evaporating-surface, which causes the liquid to form into vapors until the last drop is used up and the absorbent material is completely dry.

I have burned my lamp for six hours with not more than three ounces of benzine.

The wick is protected by the wire-gauze cylinder, so that the same will not absorb any more liquid from the absorbent material than required to feed the flame, and the most volatile liquid can be burned with perfect safety.

Having thus described my invention, what I claim as new, and desire to secure by Letters Patent, is—

The reservoir A, having hollow handles H, with suitable absorbent material, D, and non-absorbent material, E, in combination with the gauze cylinder F, constructed, arranged, and operating substantially as described, for the purpose specified.

The above specification of my invention signed by me this 5th day of May, 1866.

DR. KARL RIEDEL.

Witnesses:
WM. F. MCNAMARA,
ALEX. F. ROBERTS.